United States Patent
Govea

(10) Patent No.: US 11,293,660 B2
(45) Date of Patent: Apr. 5, 2022

(54) UNIVERSAL CONTROL BOARD OPERATIVELY CONTROLLING BOTH LOW VOLTAGE AND LINE VOLTAGE LOADING

(71) Applicant: Michael Anthony Govea, Frankfort, IL (US)

(72) Inventor: Michael Anthony Govea, Frankfort, IL (US)

(73) Assignee: ChiSupply Co., Frankfort, IL (US)

(*) Notice: Subject to any disclaimer, the term of this patent is extended or adjusted under 35 U.S.C. 154(b) by 274 days.

(21) Appl. No.: 16/730,324

(22) Filed: Dec. 30, 2019

(65) Prior Publication Data
US 2020/0355384 A1 Nov. 12, 2020

Related U.S. Application Data

(60) Provisional application No. 62/844,852, filed on May 8, 2019.

(51) Int. Cl.
F24F 11/58 (2018.01)
F24F 11/30 (2018.01)
G05B 15/02 (2006.01)
F24F 11/74 (2018.01)
F24F 11/65 (2018.01)
F24F 11/77 (2018.01)
F24F 110/20 (2018.01)
F24F 8/22 (2021.01)

(52) U.S. Cl.
CPC ............. F24F 11/58 (2018.01); F24F 11/30 (2018.01); F24F 11/65 (2018.01); F24F 11/74 (2018.01); F24F 11/77 (2018.01); G05B 15/02 (2013.01); F24F 8/22 (2021.01); F24F 2110/20 (2018.01); F24F 2221/02 (2013.01)

(58) Field of Classification Search
CPC .... F24F 8/22; F24F 11/30; F24F 11/58; F24F 11/65; F24F 11/74; F24F 11/77; F24F 2110/20; F24F 2221/02; G05B 15/02; G05B 2219/2614
See application file for complete search history.

(56) References Cited

U.S. PATENT DOCUMENTS

| 4,969,508 | A | 11/1990 | Tate et al. |
| 5,592,989 | A | 1/1997 | Lynn et al. |
| 6,407,469 | B1 | 6/2002 | Cline et al. |
| 8,558,179 | B2 | 10/2013 | Filson et al. |
| 9,206,993 | B2 | 12/2015 | Barton et al. |
| 9,459,018 | B2 * | 10/2016 | Fadell ............... G08B 29/02 |
| 9,686,880 | B1 | 6/2017 | Khoury et al. |
| 9,702,582 | B2 * | 7/2017 | Svendsen ............ F24F 11/30 |
| 10,175,668 | B2 * | 1/2019 | Fadell ................ F24F 11/30 |
| 10,288,308 | B2 * | 5/2019 | Svendsen ............ G05B 19/048 |
| 10,288,309 | B2 * | 5/2019 | Svendsen ............ G05B 15/02 |
| 10,309,405 | B2 * | 6/2019 | Arensmeier ......... F24F 11/77 |
| 10,436,977 | B2 * | 10/2019 | Bergman ............ F24F 11/30 |

(Continued)

Primary Examiner — Crystal J Barnes-Bullock
(74) Attorney, Agent, or Firm — Dunlap Bennett & Ludwig, PLLC

(57) ABSTRACT

A universal control board for high-rise buildings is provided. The universal control board provides a communication system that operatively associates low voltage loading, including a WIFI thermostat application, with line voltage equipment for providing energy savings, humidification, dehumidification, UV lighting and multiple fan applications in high-rise buildings.

3 Claims, 2 Drawing Sheets

(56) References Cited

U.S. PATENT DOCUMENTS

| | | | |
|---|---|---|---|
| 10,852,025 B2 * | 12/2020 | Leen | H05K 7/1427 |
| 10,921,014 B1 * | 2/2021 | Walsh | H02M 7/06 |
| 11,054,165 B2 * | 7/2021 | Svendsen | G05D 23/00 |
| 11,118,590 B2 * | 9/2021 | Arensmeier | F24F 11/77 |
| 2003/0041605 A1 | 3/2003 | Butcher et al. | |
| 2004/0222307 A1 | 11/2004 | DeLuca | |
| 2005/0040943 A1 | 2/2005 | Winick | |
| 2006/0032246 A1 | 2/2006 | Kates | |
| 2006/0131511 A1 | 6/2006 | Ehlers | |
| 2008/0065926 A1 | 3/2008 | Poth et al. | |
| 2008/0198007 A1 | 8/2008 | Chi-Jung | |
| 2009/0128068 A1 | 5/2009 | Mullin | |
| 2010/0163633 A1 | 7/2010 | Barrett et al. | |
| 2010/0182743 A1 | 7/2010 | Roher | |
| 2014/0085093 A1 | 3/2014 | Mittleman et al. | |
| 2014/0152631 A1 | 6/2014 | Moore et al. | |
| 2014/0205500 A1 | 7/2014 | Sakaki | |
| 2015/0316285 A1 | 11/2015 | Clifton et al. | |
| 2015/0323215 A1 * | 11/2015 | Arensmeier | G01M 99/008 702/182 |
| 2015/0323941 A1 | 11/2015 | Pariseau et al. | |
| 2015/0345821 A1 | 12/2015 | Alsaleem | |
| 2016/0232778 A1 | 8/2016 | Honjo et al. | |
| 2018/0119973 A1 | 5/2018 | Rothman et al. | |

\* cited by examiner

UNIVERSAL CONTROL BOARD OPERATIVELY CONTROLLING BOTH LOW VOLTAGE AND LINE VOLTAGE LOADING

CROSS-REFERENCE TO RELATED APPLICATION

This application claims the benefit of priority of U.S. provisional application No. 62/844,852, filed 8 May 2019, the contents of which are herein incorporated by reference.

BACKGROUND OF THE INVENTION

The present invention relates to thermostat control boards and, more particularly, a universal control board that operatively associates a low voltage WIFI thermostat and other low voltage loading applications with line or low voltage equipment for providing energy efficient humidification, dehumidification, lighting and multiple fan applications in high-rise buildings.

Line voltage loads and low voltage loads do not work together in residential and commercial applications because of the requirement of having separate control boards: a line voltage load control board and a low voltage control system. As a result, typically, high rise buildings employ only line voltage equipment, which can result in suboptimal output for thermostat applications better suited for low voltage loading. This is because the line-voltage equipment comes with line-voltage mechanical thermostats, which do not offer WIFI humidity or UV control in the serviced condos and apartments of the high-rise building. It should be understood that the use of the term "WIFI" refers to one or many possible WIFI networking technologies, based on the IEEE 802.11 family of standards, commonly used for local area networking of devices and Internet access.

As you can see, there is a need for a control board that enables a low voltage loading WIFI thermostat operatively associated with line voltage equipment for providing humidification, dehumidification, lighting and multiple fan speed applications. The systemic control board embodied in the present invention is adapted to allow the end user to use high or low voltage humidifiers and UV lamps with line or low voltage equipment, whereby a coupled low voltage WIFI thermostat facilitates saving energy through, among other things, optimized dehumidification applications. Any universal low voltage WIFI thermostat can be used with the present invention so as to be operatively associated with lighting, dehumidification and humidification applications with line voltage equipment in high rise apartments. In other words, the present invention offers a universal control board for both line voltage and low voltage applications, enabling both loading types to work together through the one universal control board.

Therefore, the present invention can be used to reduce asthma attacks, allergies, dry skin, mold, bacteria, dust mite buildup, while allowing the customer to use a WIFI thermostat that offers dehumidification, on top of offering energy efficiency. Specifically, there is a novel communicator between the low voltage side to the line voltage side, allowing the use of the WIFI thermostat with line voltage equipment as well as enabling dehumidification, humidification and lighting application whether those controls are low or line voltage. Thereby, users of the universal board embodied in the present invention can use both low and line voltage, offering a variety of options to improve the efficiency of their services, the air quality and their health.

SUMMARY OF THE INVENTION

In one aspect of the present invention, control system for enabling a low voltage WIFI thermostat to operatively associate with a plurality of line-voltage and low-voltage equipment for providing humidification, dehumidification and lighting applications in a high-rise building includes the following: a systemic control board configured to couple to a 120-volt or a 240-volt system and transform a voltage of the 120-volt or the 240-volt system for a plurality of low-volt equipment and a plurality of line-voltage equipment; the plurality of low-volt equipment includes the following: a WIFI thermostat; at least one low-voltage humidification device; and at least one low-voltage dehumidification device; the plurality of line-volt equipment includes: at least one ultra-violet lighting device; at least one line-voltage humidification device; and at least one line-voltage dehumidification device; and a fan operatively associated with the systemic control board and each humidification and dehumidification device, wherein the WIFI thermostat controls each humidification and dehumidification device and the at least one ultra-violet lighting device, wherein the fan comprises three speeds: high, medium and low.

In another aspect of the present invention, a method of improving control of air quality in a high-rise building includes the following: providing the above-mentioned control system and operating the WIFI thermostat to selectively control the fan for both the at least one low-voltage dehumidification device and the at least one line-voltage dehumidification device through operation of one of the three speeds of the fan; and selectively power the at least one ultra-violet lighting device.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a universal control board that operatively associates a low voltage WIFI thermostat and other low voltage loading applications with line voltage equipment for providing energy efficient humidification, dehumidification, lighting and multiple fan applications in high-rise buildings.

Figure 1:
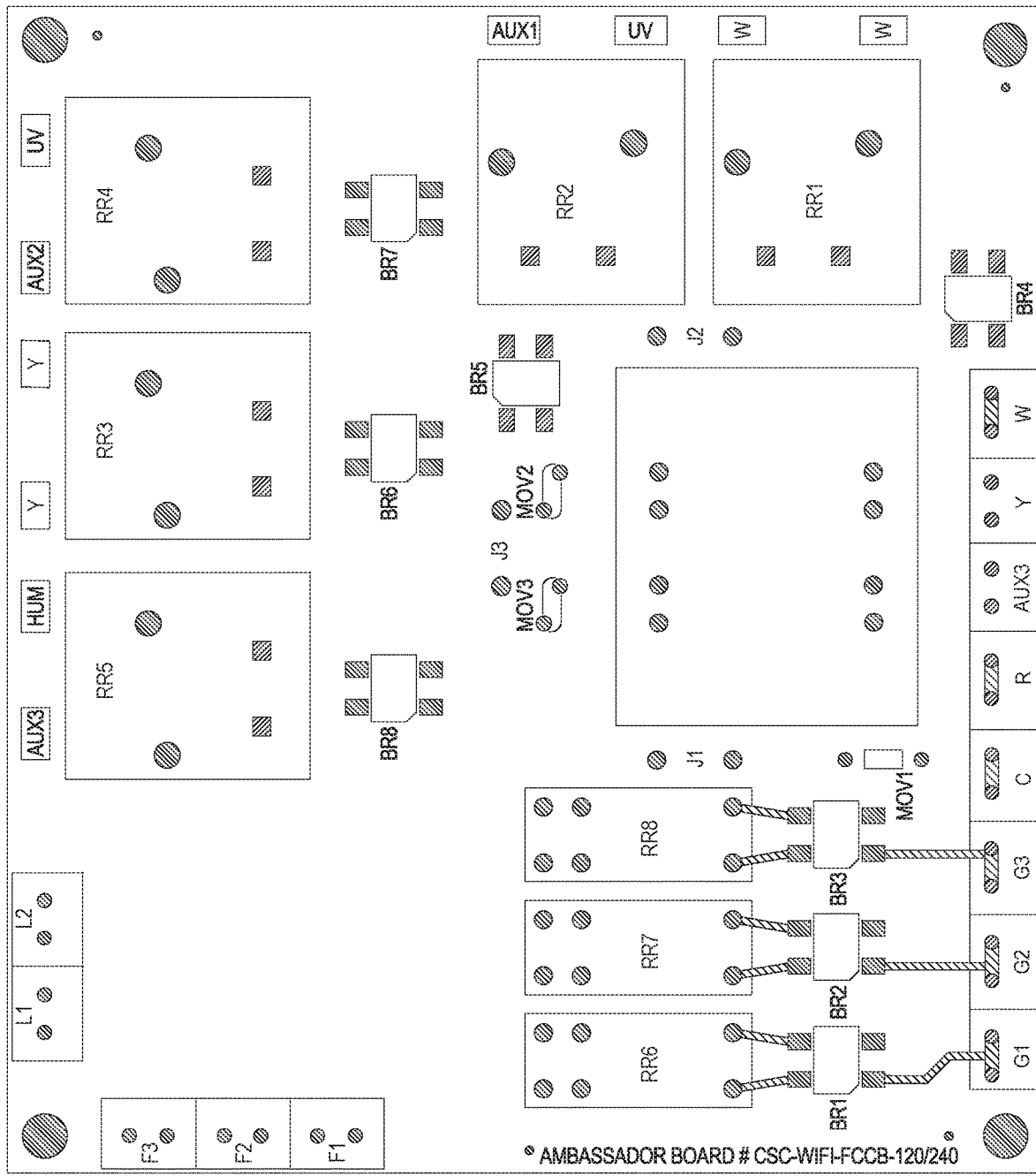
FIG. 1 is a schematic view of an exemplary embodiment of a control board of the present invention.
Figure 2:
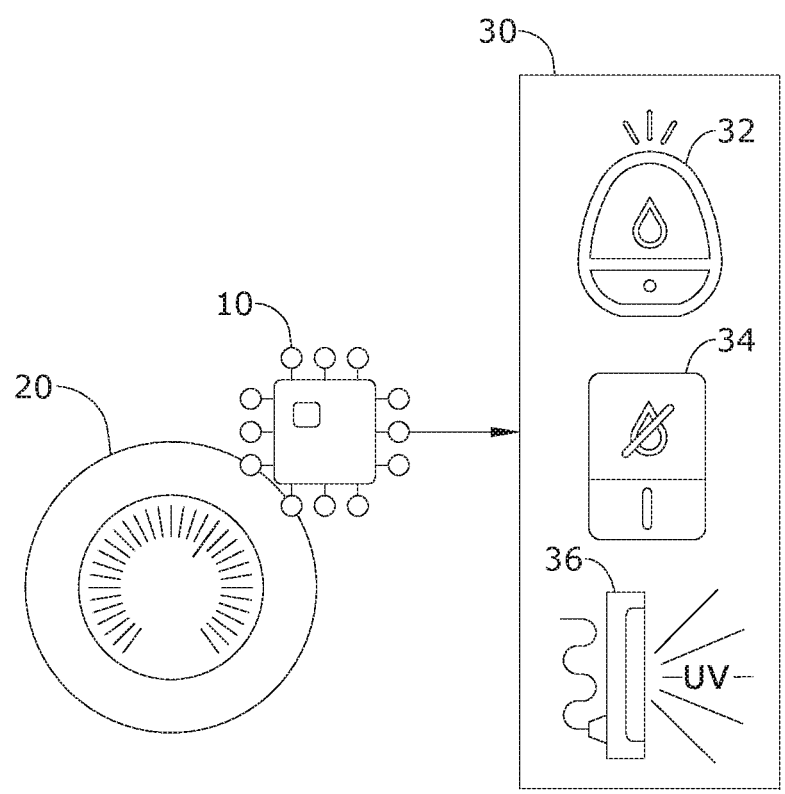
FIG. 2 is a schematic view of an exemplary embodiment of the control board of the present invention, demonstrating a system enabling communication between low-voltage and line-voltage elements.

Referring to FIGS. 1 and 2, the present invention may include at least one computer or control circuitry. The computer may include at least one processing unit coupled to a form of memory. The computer may include, but not limited to, a microprocessor, a server, a desktop, laptop, and smart device, such as, a tablet and smart phone. The computer includes a program product including a machine-readable program code for causing, when executed, the computer to perform steps. The program product may include software which may either be loaded onto the computer or accessed by the computer. The loaded software may include an application on a smart device. The software may be accessed by the computer using a web browser. The computer may access the software via the web browser using the internet, extranet, intranet, host server, internet cloud and the like.

The computer may be operatively associated the systemic control board 10 that enables a low voltage WIFI thermostat 20 operatively associated with line voltage equipment 30 for providing humidification 32, dehumidification 34 and lighting applications 36.

The systemic control board 10 may electrically connect the following electronics: relays RR1, RR2, RR3, RR4 and RR5, FR1, FR2 and FR3, transformers jumpers J1 and J2, bridge rectifiers BR1-BR8, MOV (Metal Oxide Varistor) 1-3, ¼" tabs 13. The electronic components are electrically associated to electrical operating power connections W, Y, AUX3, and G1-3. Electrical operating power connection W will go through BR4 which energizes RR1 and RR2 and turns on your heat and lighting applications 36, such as ultraviolet (UV) lamps. Electrical operating power connection Y goes through BR6 which energizes RR3 and RR4 turns on cooling and the lighting applications 36. Electrical operating power connection AUX3 goes through BR8 which energizes RR5 turns on the humidification applications 32, R gets power from Transformer J2 (jumper 2). C is the common side of the transformer. Electrical operating power connection G1 goes through BR1 which energizes RR6 which energizes F1 low speed fan for dehumidification applications 34. Electrical operating power connection G2 goes through BR2 which energizes RR7 which energizes F2 medium speed fan and electrical operating power connection G3 which goes through BR3 which energizes RR8 which energizes F3 high speed fan. L1 and L2 enables power connectivity of 120 volts or 240 volts.

The systemic control board 10 distributes line voltage power to various line voltage loads, and also includes a low voltage transforming function to provide low voltage AC and DC power at various low voltages need by the electronic devices and low voltage loads. The systemic control board 10 is adapted to work with 120 or 240 volt systems, and offers three speeds high, med and low speed fan applications.

A method of using the present invention may include the following. The systemic control board 10 disclosed above may be provided. A user would, if they wanted WIFI, humidity and/or better indoor air quality and had a 240-volt system they could use a 24 WIFI thermostat with 120-volt humidifier and 120-volt UV lamp. The user can take this example and basically switch any of the voltages around—i.e., if they had 120-volt equipment they could use a 24-volt WIFI thermostat, 24-volt humidifier and 120-volt UV lamp, etc.

The computer-based data processing system and method described above is for purposes of example only, and may be implemented in any type of computer system or programming or processing environment, or in a computer program, alone or in conjunction with hardware. The present invention may also be implemented in software stored on a computer-readable medium and executed as a computer program on a general purpose or special purpose computer. For clarity, only those aspects of the system germane to the invention are described, and product details well known in the art are omitted. For the same reason, the computer hardware is not described in further detail. It should thus be understood that the invention is not limited to any specific computer language, program, or computer. It is further contemplated that the present invention may be run on a stand-alone computer system, or may be run from a server computer system that can be accessed by a plurality of client computer systems interconnected over an intranet network, or that is accessible to clients over the Internet. In addition, many embodiments of the present invention have application to a wide range of industries. To the extent the present application discloses a system, the method implemented by that system, as well as software stored on a computer-readable medium and executed as a computer program to perform the method on a general purpose or special purpose computer, are within the scope of the present invention. Further, to the extent the present application discloses a method, a system of apparatuses configured to implement the method are within the scope of the present invention.

It should be understood, of course, that the foregoing relates to exemplary embodiments of the invention and that modifications may be made without departing from the spirit and scope of the invention as set forth in the following claims.

What is claimed is:

1. A control system for enabling a low voltage WIFI thermostat to operatively associate with a plurality of line-voltage and low-voltage equipment for providing humidification, dehumidification and lighting applications in a high-rise building, comprising:
   a systemic control board configured to couple to a 120-volt or a 240-volt system and transform a voltage of the 120-volt or the 240-volt system for a plurality of low-volt equipment and a plurality of line-voltage equipment;
   the plurality of low-volt equipment comprises:
      a WIFI thermostat;
      at least one low-voltage humidification device;
      at least one low-voltage dehumidification device; and
   the plurality of line-volt equipment comprises:
      at least one ultra-violet lighting device;
      at least one line-voltage humidification device; and
      at least one line-voltage dehumidification device; and
   a fan operatively associated with the systemic control board and each humidification and dehumidification device,
   wherein the WIFI thermostat controls each humidification and dehumidification device and the at least one ultra-violet lighting device.

2. The control system of claim 1, wherein the fan comprises three speeds: high, medium and low.

3. A method of improving control of air quality in a high-rise building, comprising:
   providing the control system of claim 2;
   operating the WIFI thermostat to selectively control the fan for both the at least one low-voltage dehumidification device and the at least one line-voltage dehumidification device through operation of one of the three speeds of the fan; and
   selectively power the at least one ultra-violet lighting device.

* * * * *